April 21, 1931.  H. D. BOWMAN  1,801,999

LOCK WASHER

Filed Oct. 15, 1927

Hyman D. Bowman
INVENTOR.
BY Ralph Donath
Paul Purchard
ATTORNEYS.

Patented Apr. 21, 1931

1,801,999

UNITED STATES PATENT OFFICE

HYMAN D. BOWMAN, OF PITTSBURGH, PENNSYLVANIA

LOCK WASHER

Application filed October 15, 1927. Serial No. 226,294.

This invention relates to bolt and nut washers and more in particular to lock-washers.

The primary object of this invention is to provide a resilient washer which will exert a continuous pressure upon the bolt-nut, thus preventing said nut from working loose. Another object of this invention is the provision of a lock-washer adapted to engage the shank of the bolt as well as the nut thereof, to provide double locking means against relative movement between the bolt and nut. A further object of this invention is to provide a lock-washer having the above features and which is well adapted, owing to its simplicity, to be manufactured by the stamping process. Additional features and advantages of this invention will appear in the course of the following description considered in connection with the accompanying drawing forming a part of this application, and in which:

Figure 1:
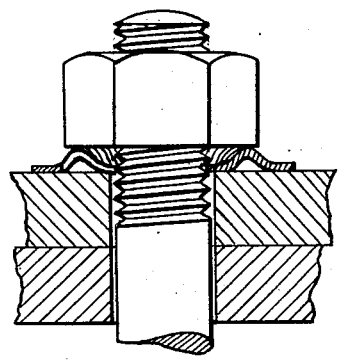
Fig. 1 is a fragmentary view, partly shown in section, illustrating a bolt and nut locked by a lock-washer of my invention.
Figure 4:
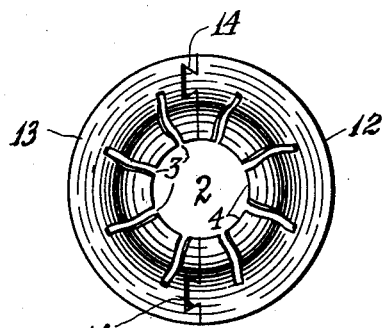
Fig. 4 is a similar view showing another modification.
Figure 2:
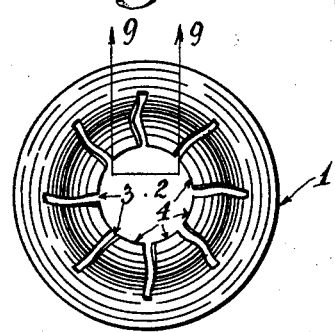
Fig. 2 is a top plan view of the lock-washer used in Fig. 1.

Referring to the drawing, a lock-washer made according to my invention consists of a disc 1 having a central aperture 2 adapted to fit snugly about the threaded shank of the bolt to which it is applied. Radial slots 3, of suitable length, are provided to divide the inner portion of the washer into any desired number of sector-shaped fingers 4.

Figure 9:
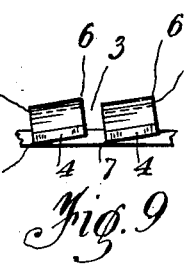
Fig. 9 is a detail view showing in elevation two of the bolt engaging fingers, between lines 9—9, Fig. 2.

As shown in the various figures, these fingers are provided intermediate their inner ends and places of attachment to the main body of the disc with concentrically arranged concavo-convex bends 5 which are adapted to be engaged by the underside of the bolt-nut. These fingers are also bent transversely at an angle to fit the threads of the bolt at one side thereof, as shown in Fig. 9.

It will be readily understood that, when the bends 5 are compressed by the nut, the fingers 4 will be straightened and their inner ends forced toward the center of the washer, thus causing said inner ends to exert a right-angularly directed pressure against the shank of the bolt; and the radial, upper, edges 6 of the transversely bent portions of the fingers will dig into the underside of the nut, while the lower, opposite, radial edge 7 of each finger will cut into the bolted element.

At the same time, the spring effect of these flattened fingers will force the nut into close engagement with the threads of the nut, thus providing several simultaneously operating means to prevent the accidental loosening of the nut on said bolt.

Figure 8:
Fig. 8 is a fragmentary perspective view showing a resilient nut-holding lug applicable to any desired type of lock-washer of my invention, and especially shown in Fig. 5.
Figure 5:
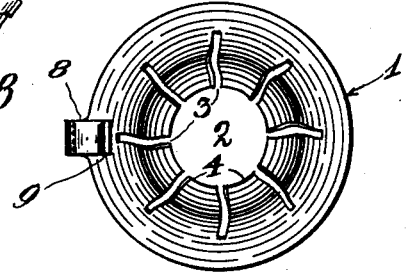
Fig. 5 shows a top plan view of still another modification.

In Figs. 5 and 8 is shown a washer having a substantially U-shaped, resilient, lug 8 which is designed to press against the flats of the nut. If desired, two or more such lugs could, of course, be provided. Owing to the elasticity of this lug, the free upwardly directed inner end 9 of this lug may snap over the corners of a polygonal nut, as the latter is being screwed down on the bolt.

Figure 3:
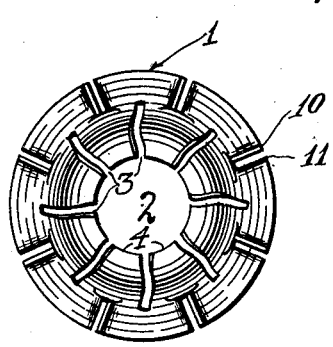
Fig. 3 is a top plan view of a modified washer.
Figure 7:
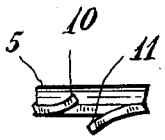
Fig. 7 is a fragmentary view of a view showing a front elevation of the peripheral gripping means shown in Figs. 3 and 6.
Figure 6:
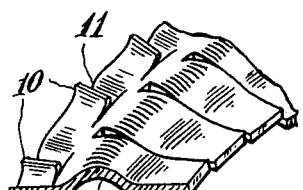
Fig. 6 is a fragmentary perspective view corresponding to Fig. 3.

Another method of further preventing the loosening of the nut or bolt is shown in Figs. 3, 6 and 7, in which upwardly and downwardly directed resilient lugs 10, 11 are formed in the outer periphery of the washer. These lugs have sharp edges which respectively dig into the underside of the nut and the adjacent element which is to be secured by the bolt. If desired, the lugs 10 and 11 may be used in combination with any one of the alternative constructions shown in the drawing. It will be noted, in Fig. 7 especially, that the lugs 10 are slightly lower than the top of the bends 5 and that the latter will have to be flattened partly by the nut before said lugs will become effective; this is done in order to reduce the length of said lugs to the proper amount to produce a strong spring action.

Although the washers built according to this invention are intended to be made of resilient material, it may happen that they will lose part, or all, of their springiness after prolonged application. In such a case, it would be practically impossible to remove a washer without cutting it in pieces, because of the spring-fingers digging into the threads of the bolt, and at one side thereof even reaching down to the root of said threads. This contingency may be taken care of by making the washer, from the beginning, in two semi-circular parts 12 and 13 separably joined together by a dovetail connection 14. To remove a flattened, so-called "dead" washer, all that is necessary to be done is to separate the two halves of the washers by prying them off by means of a screw-driver or knife, as will be readily understood.

While I have illustrated and described herein different embodiments of my invention, as applied to washers of circular shape, it may be found advisable after continued experience to make additional modifications in the construction or shape thereof, and I intend to include in this application all such variations which fall within the scope of the appended claims.

I claim:

1. In a nut lock comprising a flat plate having an aperture adapted to be engaged by a bolt, a plurality of radially disposed sector-like fingers arranged side by side about said aperture and twisted transversely; said fingers having intermediate their inner and outer ends substantially semi-circular concavo-convex portions adapted to be engaged and flattened by the nut to be locked, whereby said fingers are caused to exert a rectangularly directed pressure against the body portion of said bolt.

2. In a nut lock comprising a flat plate having an aperture adapted to be engaged by a bolt, a plurality of radially disposed sector-like fingers arranged side by side about said aperture and twisted transversely; said fingers having intermediate their inner and outer ends substantially semi-circular concavo-convex portions adapted to be engaged and flattened by the nut to be locked, whereby said fingers are caused to exert a rectangularly directed pressure against the body portion of said bolt; the angle of twist on said fingers corresponding substantially to the angle of the threads on one side of said bolt.

3. In a nut lock comprising a flat plate having an aperture adapted to be engaged by a bolt, a plurality of radially disposed sector-like fingers arranged side by side about said aperture and twisted transversely; said fingers having intermediate their inner and outer ends substantially semi-circular concavo-convex portions adapted to be engaged and flattened by the nut to be locked, and a substantially U-shaped resilient lug positioned peripherally on said nut-lock.

4. In a nut lock comprising a flat plate having an aperture adapted to be engaged by a bolt, a plurality of radially disposed sector-like fingers arranged side by side about said aperture and twisted transversely; said fingers having intermediate their inner and outer ends substantially semi-circular concavo-convex portions adapted to be engaged and flattened by the nut to be locked, and a plurality of alternately up and downwardly directed radial lugs formed at the outer periphery of said nut lock, also adapted to be flattened by said nut.

5. In a nut lock comprising a flat plate having an aperture adapted to be engaged by a bolt, a plurality of radially disposed sector-like fingers arranged side by side about said aperture and twisted transversely; said fingers having intermediate their inner and outer ends substantially semi-circular concavo-convex portions adapted to be engaged and flattened by the nut to be locked, and a plurality of alternately up and downwardly directed radial lugs formed at the outer periphery of said nut lock also adapted to be engaged by said nut; said radial lugs being of lesser height than the raised portion of said fingers.

In testimony whereof I affix my signature.
HYMAN D. BOWMAN.